United States Patent [19]

Okabe et al.

[11] Patent Number: 5,028,656

[45] Date of Patent: Jul. 2, 1991

[54] RESIN COMPOSITION, AND MOLDED ARTICLES THEREFROM

[75] Inventors: Masao Okabe, Abiko; Akikzau Amgai, Tokyo; Haruaki Eto, Toyonaka; Yasuo Tanaka, Tokyo, all of Japan

[73] Assignee: Mitsubishi Gas Chemical Company, Inc., Tokyo, Japan

[21] Appl. No.: 356,325

[22] Filed: May 23, 1989

[30] Foreign Application Priority Data

May 25, 1988 [JP] Japan .................................. 63-125669

[51] Int. Cl.$^5$ ............................................. C08L 71/12
[52] U.S. Cl. .................................... 524/540; 525/391; 525/392; 525/395; 525/537
[58] Field of Search ............... 525/390, 391, 392, 393, 525/395, 396, 397; 524/540

[56] References Cited

U.S. PATENT DOCUMENTS 4,528,346  7/1985  Sugie et al. ..................... 525/396

FOREIGN PATENT DOCUMENTS 156561  12/1975  Japan .
129422  10/1980  Japan .
135160  10/1980  Japan .
213758  12/1984  Japan .
65351   3/1987   Japan .

*Primary Examiner*—John C. Bleutge
*Assistant Examiner*—David W. Woodward
*Attorney, Agent, or Firm*—Wenderoth, Lind & Ponack

[57] ABSTRACT

A resin composition consisting essentially of
  (A) a polyphenylene ether having added thereto an unsaturated carboxylic acid having 3 to 10 carbon atoms or an anhydride thereof (component A),
  (B) a polyphenylene sulfide (component B), and
  (C) a polyisocyanate compound (compound C), the weight ratio of component A to component B being from 5:95 to 95:5 and the amount of component C being from 0.01 to 10% by weight based on the total weight of components A and B; and molded articles therefrom.

9 Claims, No Drawings

RESIN COMPOSITION, AND MOLDED ARTICLES THEREFROM

BACKGROUND OF THE INVENTION

1. Field of the Invention

This invention relates to a resin composition which has excellent moldability and gives molded articles having excellent heat resistance, solvent resistance and mechanical properties, and to molded articles therefrom. More specifically, it relates to a resin composition consisting essentially of a modified polyphenylene ether, a polyphenylene sulfide and a polyisocyanate, and to molded articles therefrom.

2. Description of the Prior Art

It is well known that polyphenylene ether resins are extensively used as engineering plastics because of their excellent heat resistance, rigidity and electrical properties, but have the serious defect of poor solvent resistance and moldability.

On the other hand, polyphenylene sulfide resins are known to have excellent heat resistance, solvent resistance, electrical properties, mechanical properties, dimensional stability and fire retardancy, and have recently attracted attention. These properties of the polyphenylene sulfide can be improved by combining it with a fibrous reinforcing material such as glass fibers and carbon fibers or an inorganic filler such as talc, clay and silica, and such composite materials have found extensive use in electrical and electronic component parts and machine structural parts. However, the polyphenylene sulfide has a low degree of polymerization and is difficult to mold. Molded articles from it lack tenaciousness and are brittle. Molded articles of polyphenylene sulfide reinforced with glass fibers tend to undergo warpage.

It was proposed to blend polyphenylene ether with polyphenylene sulfide to prepare a resin composition having improved moldability and fire retardancy (Japanese Patent Publication No. 34032/1981). In this resin composition, an improvement in the moldability of the polyphenylene ether is noted. But since the compatibility between the polyphenylene ether and the polyphenylene sulfide is low, molded articles prepared from the composition have a poor appearance and degraded mechanical properties. Furthermore, when this molded article is contacted with a solvent, the polyphenylene ether and the polyphenylene sulfide are completely separated from each other, and the solvent resistance of the molded article is extremely low.

To improve the compatibility between the polyphenylene ether and the polyphenylene sulfide, a resin composition comprising these and an epoxy resin was proposed (see Japanese Patent Publication No. 11063/1985). With this composition, the compatibility between the polyphenylene ether and the polyphenylene sulfide is improved to some extent, but is still not fully satisfactory. Furthermore, a molded article from it does not have sufficient mechanical properties, and the solvent resistance of this article is not at all improved.

SUMMARY OF THE INVENTION

It is an object of this invention to provide a resin composition of polyphenylene ether and polyphenylene sulfide having much improved compatibility between the two components.

Another object of this invention is to provide a resin composition comprising polyphenylene ether and polyphenylene sulfide as main polymer components which gives molded articles having excellent mechanical properties and thermal resistance.

Still another object of the invention is to provide a resin composition which comprises polyphenylene ether and polyphenylene sulfide as main polymer components and gives molded articles having excellent solvent resistance and a good appearance.

Yet another object of this invention is to provide a molded article having excellent mechanical properties, thermal resistance, solvent resistance and appearance.

Further objects of this invention will become apparent from the following description.

In accordance with this invention, the above objects are achieved by a resin composition consisting essentially of
(A) a polyphenylene ether having added thereto an unsaturated carboxylic acid having 3 to 10 carbon atoms or an anhydride thereof (component A),
(B) a polyphenylene sulfide (component B), and
(C) a polyisocyanate compound (component C), the weight ratio of component A to component B being from 5:95 to 95:5 and the amount of component C being from 0.01 to 10% by weight based on the total weight of components A and B.

In accordance with another aspect of this invention, there is provided a resin composition consisting essentially of
(A) a polyphenylene ether (component A'),
(B) a polyphenylene sulfide (component B),
(C) a polyisocyanate (component C), and
(D) an unsaturated carboxylic acid having 3 to 10 carbon atoms or an anhydride thereof (component D), the weight ratio of component A' to component B being from 5:95 to 95:5, and the amount of component C being from 0.01 to 10% by weight based on the total weight of components A' and B, and the amount of component D being from 0.01 to 5% by weight based on the weight of component A'.

DETAILED DESCRIPTION OF THE INVENTION

Components A and A'

In the resin composition of this invention, a modified polyphenylene ether having added thereto an unsaturated carboxylic acid having 3 to 10 carbon atoms or its anhydride is used as component A. The polyphenylene ether not modified with the unsaturated carboxylic acid or its anhydride is referred to as component A'.

The unmodified polyphenylene ether (component A') is a polymer obtained by oxidatively polycondensing at least one monocyclic alkylphenol represented by the following general formula (I)

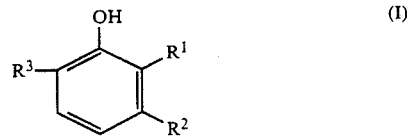

wherein $R^1$ represents an alkyl group having 1 to 3 carbon atoms, and $R^2$ and $R^3$, independently from each other, represent a hydrogen atom or an alkyl group having 1 to 3 carbon atoms.

Such polymers and a process for their production are well known.

Examples of the monocyclic alkylphenol of general formula (I) include
2,6-dimethylphenol,
2,6-diethylphenol,
2,6-dipropylphenol,
2-methyl-6-ethylphenol,
2-methyl-6-propylphenol,
2-ethyl-6-propylphenol,
p-cresol,
2,3-dimethylphenol,
2,3-dipropylphenol,
2-methyl-3-ethylphenol,
2-methyl-3-propylphenol,
2-ethyl-3-methylphenol,
2-ethyl-3-propylphenol,
2-propyl-3-methylphenol,
2-propyl-3-ethylphenol,
2,3,6-trimethylphenol,
2,3,6-triethylphenol,
2,3,6-tripropylphenol,
2,6-dimethyl-3-ethylphenol, and
2,6-dimethyl-3-propylphenol.

Examples of the polyphenylene ether (component A') obtained by polycondensation of at least one of such alkylphenols include
poly(2,6-dimethyl-1,4-phenylene) ether,
poly(2,6-diethyl-1,4-phenylene) ether,
poly(2,6-dipropyl-1,4-phenylene) ether,
poly(2-methyl-6-ethyl-1,4-phenylene) ether,
poly(2-methyl-6-propyl-1,4-phenylene) ether,
poly(2-ethyl-6-propyl-1,4-phenylene) ether,
2,6-dimethylphenol/2,3,6-trimethylphenol copolymer,
2,6-dimethylphenol/2,3,6-triethylphenol copolymer,
2,6-diethylphenol/2,3,6-trimethylphenol copolymer,
2,6-dipropylphenol/2,3,6-trimethylphenol copolymer,
poly(2,6-dimethyl-1,4-phenylene)ether having ethylene grafted thereto, and
2,6-dimethylphenol/2,3,6-trimethylphenol copolymer having styrene grafted thereto.

Among these polyphenylene ethers as component A', poly(2,6-dimethyl-1,4-phenylene) ether and 2,6-dimethylphenol/2,3,6-trimethylphenol copolymer are particularly preferred.

Preferably, the polyphenylene ether as component A' has a number average molecular weight of about 5,000 to about 50,000, especially about 7,000 to about 30,000.

The polyphenylene ether (component A') may be used after it is modified with the unsaturated carboxylic acid having 3 to 10 carbon atoms (component D; to be sometimes abbreviated as the "modifier"), or incorporated in the resin composition together with component D.

The above modifier is a compound simultaneously having (a) an ethylenic double bond and a carboxyl group or an acid anhydride group in the molecule, and has 3 to 10 carbon atoms, preferably 3 to 4 carbon atoms, in total. Preferably, the modifier (component D) has (a) one ethylenic double bond and (b) 1 or 2 carboxyl groups or one acid anhydride group in the molecule.

Examples of the modifier (component D) include alpha,beta-unsaturated dicarboxylic acids such as maleic acid, fumaric acid, chloromaleic acid, citraconic acid and itaconic acid; unsaturated monocarboxylic acids such as acrylic acid, furoic acid, crotonic acid, vinylacetic acid, methacrylic acid, pentenoic acid and angelic acid; and anhydrides of these alpha,beta-unsaturated dicarboxylic acids and unsaturated monocarboxylic acids. Among them, maleic acid, acrylic acid, methacrylic acid and maleic anhydride are preferred, and maleic anhydride is most preferred.

The modifier (component D) for modifying the polyphenylene ether (component A') may be added to the polyphenylene ether to modify it in advance, or may be directly added as a component of the resin composition. Advantageously, it is added to the polyphenylene ether in advance.

The modified polyphenylene ether obtained by addition of the modifier may be prepared by various methods. For example, the modified polyphenylene ether (component A) may be prepared by (i) melt-kneading the polyphenylene ether (component A') and the modifier (component D) by a roll mill, a Banbury mixer, an extruder or the like at a temperature of 150° to 350° C., or (ii) heating the polyphenylene ether (component A') and the modifier (component D) in a solvent such as benzene, toluene or xylene at a temperature of, for example, 50° to 150° C. and thus reacting them with each other. By whatever method may be used, it is effective to use a radical initiator in the reaction system in order to facilitate the modifying reaction. Typical examples of the radical initiator are organic peroxides such as benzoyl peroxide, di-t-butyl peroxide, dicumyl peroxide and t-butyl peroxybenzoate, and azo compounds such as azobisisobutyronitrile and azobisisovaleronitrile.

Advantageously, the proportion of the modifier used to modify the polyphenylene ether (component A') by the above method is 0.01 to 5% by weight, preferably 0.1 to 3% by weight, based on the polyphenylene ether. On the other hand, when the modifier is to be added as an independent component without using it to modify the polyphenylene ether, the proportion of the modifier (component D) is usually 0.01 to 5% by weight, preferably 0.1 to 3% by weight, based on the polyphenylene ether (component A') as in the above case. If the unmodified polyphenylene ether (component A') and the modifier (component D) together with the polyphenylene sulfide (component B) and the polyisocyanate (component C) are melt-mixed under heat for preparation of a composition, a reaction of modifying the component A' with the modifier takes place, and a substantially modified polyphenylene ether is formed.

Component B

The polyphenylene sulfide used as component B in the resin composition of this invention may be any one of known polyphenylene sulfide polymers. Preferred polyphenylene sulfides are those which contain at least 70 mole %, preferably at least 90 mole %, of recurring units of the following formula (II)

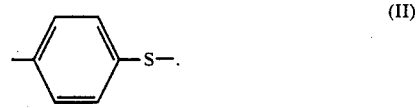

(II)

If the proportion of the recurring units of formula (II) is less than 70 mole %, it is difficult to produce a molded article having the desired properties from the resulting resin composition.

At least one of the following recurring units may be used in an amount of less than 30 mole %, preferably less than 10 mole %, as comonomers for the polyphenylene sulfide (component B).

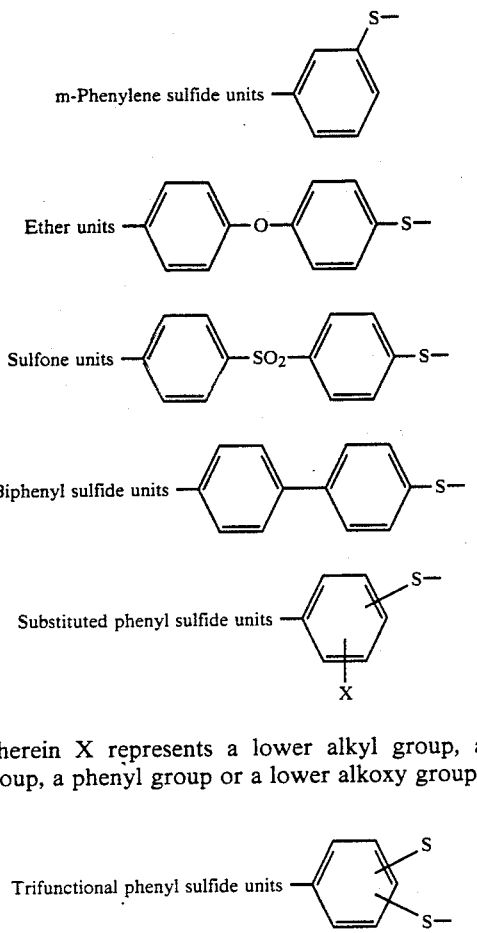

m-Phenylene sulfide units (i)

Ether units (ii)

Sulfone units (iii)

Biphenyl sulfide units (iv)

Substituted phenyl sulfide units (v)

wherein X represents a lower alkyl group, a nitro group, a phenyl group or a lower alkoxy group.

Trifunctional phenyl sulfide units (vi)

For the purpose of this invention, the polyphenylene sulfide desirably has a melt viscosity at 300° C. of about 100 to about 40,000 poises, preferably about 100 to about 20,000 poises. The polyphenylene sulfide used in this invention may be one obtained by any of various methods, or may be a commercially available one, if only it meets the various conditions described above. A typical example of the method of producing the polyphenylene sulfide comprises reacting p-dichlorobenzene or a mixture of it with a comonomer with sodium sulfide in a polar solvent of the amide type such as N-methylpyrrolidone or dimethyl acetamide, or a sulfone-type solvent such as sulfolane.

The polyphenylene sulfide used in this invention may be partly modified with an aminothiophenol such as p-aminothiophenol. The modification may be carried out, for example, by mixing the polyphenylene sulfide with 0.001 to 20% by weight, based on the polyphenylene sulfide, of the aminothiophenol, and kneading the mixture in the molten state at 290° C. to 350° C. by means of a kneader such as an extruder.

Component C

The polyisocyanate as component C to be incorporated in the resin composition of this invention is a compound having 2 to 4, preferably 2 to 3, especially preferably 2, isocyanate groups in the molecule, and may be an aliphatic, alicyclic or aromatic polyisocyanate. Preferred polyisocyanates have 3 to 17 carbon atoms, particularly 6 to 15 carbon atoms. Aromatic polyisocyanates are especially suitable for the objects of this invention.

Specific examples of the polyisocyanate (component C) include aromatic polyisocyanates such as 2,4-tolylene diisocyanate, 2,5-tolylene diisocyanate, 1,4-naphthalene diisocyanate, 1,5-naphthalene diisocyanate, 1,3-phenylene diisocyanate, 1,4-phenylene diisocyanate, 4,4'-diphenylmethane diisocyanate, 2,2'-dimethyldiphenyl-methane-4,4'-diisocyanate, 3,3'-dimethyldiphenylmethane-4,4'-diisocyanate, diphenyl-2,4'-diisocyanate, diphenyl4,4'-diisocyanate, 3,3'-dimethyldiphenyl-4,4'-diisocyanate, 3,3'-dimethoxydiphenyl-4,4'-diisocyanate, diphenylether-4,4'-diisocyanate, diphenylsulfone-4,4'diisocyanate and triphenylmethane triisocyanate; aliphatic polyisocyanates such as hexamethylene diisocyanate, 2,4,4-trimethylhexamethylene diisocyanate and 2,2,4-trimethylhexamethylene diisocyanate; and alicyclic polyisocyanates such as dicyclohexylmethane-4,4'-diisocyanate, xylylene diisocyanate, bis(isocyanatomethyl)-cyclohexane, and 3-isocyanatomethyl-3,5,5-trimethylcyclohexyl isocyanate.

These polyisocyanates may be used singly or in combination with each other. They may be modified products such as polyhydric alcohol adducts, water adducts or isocyanurate-modified products.

Among the above-exemplified polyisocyanates, 2,4-tolylene diisocyanate, 2,6-tolylene diisocyanate, 4,4'-diphenylmethane diisocyanate, 3,3'-dimethylbiphenyl-4,4'-diisocyanate, diphenyl-4,4'-diisocyanate, diphenyl ether-4,4'-diisocyanate and hexamethylene diisocyanate are particularly preferred because they are easily available and excellent for the purpose of this invention.

Preparation of a resin composition

The resin composition of this invention consists essentially of components A, B and C, or of components A', B, C and D.

The weight ratio of the modified polyphenylene ether (component A) to the polyphenylene sulfide (component B) is from 5:95 to 95:5, preferably 20:80 to 80:20. If the proportion of component A is less than 5% by weight based on the total weight of components A and B, the resin composition becomes difficult to mold, and moreover, a molded article from it becomes brittle and susceptible to warpage. On the other hand, if the proportion of component B is less than 5% by weight, the resin composition has reduced moldability and a molded article from it has lowered solvent resistance.

The polyisocyanate (component C) is incorporated in an amount of 0.01 to 10% by weight, preferably 0.05 to 5% by weight, based on the total weight of components A and B. If the proportion of the polyisocyanate is less than 0.01% by weight, a molded article from the resulting composition undesirably has reduced solvent resistance and mechanical properties.

If, on the other hand, it exceeds 10% by weight, a molded article from the resulting composition has reduced thermal resistance and a poor surface condition.

In the case of a resin composition of the invention consisting essentially of the unmodified polyphenylene ether (component A'), the polyphenylene sulfide (component B), the polyisocyanate (component C) and the modifier (component D), the suitable weight ratio of component A' to component B is from 5:95 to 95:5, preferably from 20:80 to 80:20. The proportion of component C is 0.01 to 10% by weight, preferably 0.05 to 5% by weight, based on the total weight of components A' and B. The proportion of component D is desirably 0.01 to 5% by weight, preferably 0.1 to 3% by weight, based on the weight of component A', as stated hereinabove.

There is no particular limitation on the method of mixing the components constituting the resin composition of this invention. Any method by which the components can be uniformly dispersed and mixed may be used. For example, there can be used (i) a method in which the components are mixed all together, and melt-kneaded, (ii) a method in which components A and B, or components A', B and D, are melt-kneaded first, and the mixture is then melt-kneaded with component C, and (iii) a method in which components B and C are kneaded, and the mixture is again kneaded with component A, or with components A' and D.

Advantageously, in these methods, the temperature at which the components are melt-kneaded is generally in the range of, about 150° C. to about 370° C., preferably about 250° C. to 350° C. The means for melt-kneading may be, for example, the use of an extruder, a kneader, a Banbury mixer, or a roll mill.

As required, another resin or an elastomer may be incorporated in the resin composition of this invention, and various additives generally used in resins or resin compositions may also be added as desired. The additives may include, for example, fire retardants, fire retardant aids, stabilizers, ultraviolet absorbers, plasticizers, lubricants, pigments and fillers.

Desirably, the total amount of the other resin, the elastomer and the additives is not more than 100 parts by weight, preferably not more than 80 parts by weight, especially preferably not more than 60 parts by weight, per 100 parts by weight of the resin composition of this invention.

Specific examples of the other components that can be incorporated in the resin composition of this invention will be described in detail.

Examples of the other resin include polystyrene resins, polycarbonates, polyesters, polyamides and polysulfones.

The elastomer may be defined in a general sense of the word, and the definition given at pages 71 to 78 of A.V. Tobolsky, "Properties and Structures of Polymers" (John Wiley & Sons, Inc., 1960) may be employed. Thus, the elastomer denotes a polymer having a Young's modulus at room temperature of $10^5$–$10^9$ dynes/cm$^2$ (0.1–1020 kg/cm$^2$).

Specific examples of the elastomers include A—B—A' type elastomeric block copolymers, A—B—A' type elastomeric block copolymers resulting from hydrogenation of double bonds at a polybutadiene moiety, polybutadiene, polyisoprene, copolymers of diene compounds with vinyl aromatic compounds, nitrile rubber, ethylene/propylene copolymer, ehtylene-/propylene/diene copolymers (EPDM), thiokol rubbers, polysulfide rubbers, acrylic acid rubbers, polyurethane rubbers, a grafted product of butyl rubber and polyethylene, polyester elastomers and polyamide elastomers. The A—B—A' type elastomeric block copolymers are especially preferred. The terminal blocks A and A' of these block copolymers are blocks of polymerized vinyl aromatic hydrocarbons, and B is a conjugated diene block or a conjugated diene block in which a great portion of the double bonds is hydrogenated. The molecular weight of the block B is desirably higher than that of a combination of blocks A and A'. The terminal blocks A and A' may be identical or different, and may comprise a thermoplastic homopolymer or copolymer derived from a vinyl aromatic compound whose aromatic moiety may be mononuclear or polynuclear. Examples of the vinyl aromatic compound are styrene, alpha-methylstyrene, vinyltoluene, vinylxylene, ethylvinylxylene and vinylnapathalene, and mixtures of these. The central block B comprises an elastomeric polymer derived from a conjugated diene hydrocarbon such as 1,3-butadiene, 2,3-dimethylbutadiene, isoprene, 1,3-pentadiene, or a mixture thereof. The terminal block A or A' has a molecular weight of preferably about 2,000 to about 100,000. The central block B preferably has a molecular weight of about 25,000 to about 1,000,000.

The additives include, for example, fire retardants, fire retardant aids, stabilizers, ultraviolet absorbers, lubricants, pigments, mineral fillers, inorganic fillers, and organic fillers. Examples of the fire retardants are phosphates such as triphenyl phosphate, tricresyl phosphate, a phosphate obtained from a mixture of isopropylphenol and phenol and phosphorus oxychloride; phosphate esters obtained from difunctional phenols such as benzohydroquinone or bisphenol A, an alcohol or a phenol and phosphorus oxychloride; brominated compounds typified by decabromobiphenyl, pentabromotoluene, decabromobiphenyl ether, hexabromobenzene or brominated polystyrene; and nitrogen-containing compounds such as melamine derivatives. Examples of the fire retarding aids are compounds of antimony, boron, zinc or iron. Examples of the stabilizers are sterically hindered phenols and phosphite compounds. Examples of the ultraviolet absorbers are oxalic acid diamide compounds and sterically hindered amine compounds. Examples of the lubricants include polyethylene waxes, polypropylene waxes and paraffins. Examples of the pigments are titanium dioxide, zinc sulfide and zinc oxide. Examples of the mineral fillers are glass fibers, milled fibers, glass beads, asbestos, wollastonite, mica, talc, clay, calcium carbonate, magnesium hydroxide, silica, potassium titanate fibers and rockwool. Examples of the inorganic fillers are aluminum flakes, zinc flakes, fibers of metals such as brass, aluminum and zinc. Examples of the organic fillers are carbon fibers. Fibers such as glass fibers, milled fibers, carbon fibers and potassium titanate fibers and inorganic fillers such as mica, talc and clay are preferred because the incorporation of such fillers in the resin composition leads to the production of molded articles having excellent properties. The amount of these fillers is desirably 3 to 155 parts by weight, preferably 5 to 100 parts by weight, per 100 parts by weight of the resin composition of this invention.

Investigations of the present inventors have shown that when mixed with glass fibers, the resin composition of this invention can give molded articles having very superior physical properties and excellent thermal resistance, solvent resistance and appearance. This is presumably because the resin composition and the glass fibers form a firm composite matrix.

The glass fibers in this case are mixed in a proportion of 3 to 155 parts by weight, preferably 5 to 100 parts by weight, especially 10 to 80 parts by weight, per 100 parts by weight of the resin composition. The glass fibers may be those which are usually employed as fiber reinforcements. The glass fibers may be milled fibers having a diameter of 10 to 50 micrometers and a length of 30 to 100 micrometers or ordinary glass fibers having a diameter of 10 to 50 micrometers and a length of 1 to 50 mm.

According to the present invention, the compatibility between the polyphenylene ether and the polyphenylene sulfide is improved and the resin composition can give molded articles having superior solvent resistance, excellent appearance characteristics and thermal resistance and high mechanical strength.

When glass fibers are further incorporated, the resulting resin composition has surprisingly enhanced mechanical strength in addition to these excellent properties, and can be widely used as mechanical structural materials, or electrical and electronic components parts.

The following Referential Examples, Examples and Comparative Examples specifically illustrate the resin composition of this invention.

REFERENTIAL EXAMPLE 1

Maleic anhydride (90g) was added to 3 kg of a 2,6-dimethylphenol polymer having an intrinsic viscosity, measured in chloroform at 25° C., of 0.47 (dl/g), and they were mixed by a Henschel mixer. The mixture was melt-kneaded at 300° to 320° C. and pelletized in a twin-screw extruder.

The pellets obtained (2 g) were dissolved in 50 ml of chloroform, and 500 ml of methanol was added to the solution to precipitate the polymer. The polymer was separated by filtration and dried at 80° C. under reduced pressure for 10 hours.

The resulting polymer was subjected to infrared absorption spectrochemical analysis, and the amount in weight percent of maleic anhydride linked to the polyphenylene ether was calculated by using a calibration curve drawn in advance from the polyphenylene ether and maleic anhydride. The amount of linked maleic anhydride so determined was 1.3% by weight.

REFERENTIAL EXAMPLE 2

Referential Example 1 was repeated except that 30 g of maleic anhydride was used instead of 90 g of maleic anhydride. Polyphenylene ether having 0.7% by weight of maleic anhydride linked to it was obtained.

EXAMPLE 1

Forty (40) parts by weight of the pellets of maleic anhydride-modified polyphenylene ether obtained in referential Example 1, 60 parts by weight of pellets of polyphenylene sulfide (TOHPREN T-4P with a melt viscosity of 3300 poises at 300° C., a product of TOHPREN Co. Ltd.) and 0.6 part by weight of 4,4'-diphenylmethane diisocyanate were mixed and melt-kneaded at 310° C. and 60 rpm for 7 minutes by using a laboplastomill (made by Toyo Seiki Seisakusho Co., Ltd.). The resulting resin composition was subjected to Soxhlet extraction with chloroform as a solvent for 16 hours. The extraction residue was dried in vacuo at 80° C. for 10 hours, and then weighed. The proportion of the weight of the extraction residue based on the weight of the resin composition before extraction was calculated. The result is shown in Table 1. The resin composition obtained in this example was not separated at all by the solvent, and had excellent solvent resistance.

A sample for observation under a scanning electron microscope was prepared from the resulting resin composition. That surface of the sample which was to be observed was polished and surface-treated with toluene, and then observed under a scanning electron microscope. It was determined that the modified polyphenylene ether with a particle diameter of about 1 micrometer was finely dispersed uniformly.

COMPARATIVE EXAMPLE 1

Forty (40) parts by weight of the unmodified polyphenylene ether used in Referential Example 1 was mixed with 60 parts by weight of the polyphenylene sulfide used in Example 1, and the mixture was worked up by the same operation as in Example 1.

The result is shown in Table 1. It was found that the resin composition was completely separated by the solvent, and had no appreciable solvent resistance.

A sample prepared from the resulting resin composition as in Example 1 was observed under a scanning electron microscope. It was determined that the unmodified polyphenylene ether was dispersed uniformly as coarse particles with a size of about 1 to several tens of micrometers.

EXAMPLES 2-4

Example 1 was repeated except that the modified polyphenylene ether, polyphenylene sulfide and 4,4'-diphenylmethane diisocyanate described in Example 1 were used in the proportions indicated in Example 1.

The results are shown in Table 1.

COMPARATIVE EXAMPLES 2-4

Example 1 was repeated except that the unmodified polyphenylene ether and polyphenylene sulfide described in Comparative Example 1 were used in the proportions indicated in Table 1.

The results are shown in Table 1.

TABLE 1

|  | Ex. 1 | CEx. 1 | Ex. 2 | CEx. 2 | Ex. 3 | CEx. 3 | Ex. 4 | CEx. 4 |
|---|---|---|---|---|---|---|---|---|
| Modified PPE of Referential Example 1 (parts by weight) | 40 | — | 20 | — | 60 | — | 80 | — |
| Unmodified PPE (parts by weight) | — | 40 | — | 20 | — | 60 | — | 80 |
| PPS (parts by weight) | 60 | 60 | 80 | 80 | 40 | 40 | 20 | 20 |
| MDI (parts by weight) | 0.6 | — | 0.6 | — | 0.6 | — | 0.6 | — |
| Proportion of the Soxhlet extraction | 100 | 60 | 100 | 82 | 87 | 40 | 68 | 20 |

TABLE 1-continued

|  | Ex. 1 | CEx. 1 | Ex. 2 | CEx. 2 | Ex. 3 | CEx. 3 | Ex. 4 | CEx. 4 |
|---|---|---|---|---|---|---|---|---|
| residue (%) | | | | | | | | |

Ex.: Example;
CEx.: Comparative Example;
PPE: polyphenylene ether;
PPS: polyphenylene sulfide;
MDI: 4,4'-diphenylmethane diisocyanate

COMPARATIVE EXAMPLE 5

Comparative Example 1 was repeated except that the unmodified polyphenylene ether used in Referential Example 1 was used instead of the maleic anhydride-modified polyphenylene ether.

The proportion of the Soxhlet extraction residue of the resuting composition was 60%.

EXAMPLE 5

Example 1 was repeated except that 0.75 part by weight of hexamethylene diisocyanate was used instead of the 4,4'-diphenylmethane diisocyanate.

The proportion of the Soxhlet extraction residue of the resulting resin composition was 100%.

EXAMPLES 6-9

The maleic anhydride-modified polyphenylene ether, polyphenylene sulfide and 4,4'-diphenylmethane diisocyanate described in Example 1 were mixed in the proportions indicated in Table 2. The mixture was meltk-neaded kneaded at 290° to 320 C. in a twin-screw extruder. The resulting pellets were injection-molded to prepare a ¼ inch thick flexural test sample, a test sample for heat distortion temperature measurement and a ½ thick Izod impact test sample. By using these test samples, flexural strength, heat distortion temperature (under a load of 18.6 kg) and Izod impact strength (without a notch) were measured The results are shown in Table 2.

COMPARATIVE EXAMPLEs 6-9

The unmodified polyphenylene ether used in Referential Example 1 and the polyphenylene sulfide of Example 1 were mixed in the proportions shown in Table 2, and the mixture was worked up as in Example 6. The properties of test samples obtained from the resulting composition were measured.

The results are shown in Table 2.

EXAMPLE 10

Seventy parts by weight of the pellets obtained in Example 6 and 30 parts by weight of glass fibers (CS03MA404, a product of Asahi Fiberglass Co., Ltd.) were mixed, and the mixture was worked up by the same operation as in Example 6. The molded article had a flexural strength of 1,800 kg/cm$^2$, an Izod impact strength (without a notch) of 35 kg-cm/cm and a heat distortion temperature, measured under a load of 18.6 kg/cm$^2$, of 238° C. and presented a good appearance.

EXAMPLE 11

Example 1 was repeated except that 40 parts by weight of the maleic anhydride-modified polyphenylene ether pellets obtained in Referential Example 2 were used instead of 40 parts by weight of the modified polyphenylene ether pellets used in Example 1. The proportion of the Soxhlet extraction residue of the resulting resin composition was 100%.

EXAMPLE 12

Example 6 was repeated except that 40 parts by weight of the maleic anhydride-modified polyphenylene ether obtained in Referential Example 2 was used instead of 40 parts by weight of the modified polyphenylene ether in Example 6.

A molded article obtained from the composition had the following properties.

Flexural strength: 1,230 kg/cm$^2$
Izod impact strength (without a notch): 37 kg-cm/cm
Heat distortion temperature: 168° C.
Appearance: good

EXAMPLE 13

Example 1 was repeated except that the amount of 4,4'-diphenylmethane diisocyanate was increased to 1.1 parts by weight from 0.6 part by weight. The propor-

TABLE 2

|  | Ex. 6 | CEx. 6 | Ex. 7 | CEx. 7 | Ex. 8 | CEx. 8 | Ex. 9 | CEx. 9 |
|---|---|---|---|---|---|---|---|---|
| Modified PPE of Referential Example 1 (parts by weight) | 40 | — | 20 | — | 60 | — | 80 | — |
| Unmodified PPE (parts by weight) | — | 40 | — | 20 | — | 60 | — | 80 |
| PPS (parts by weight) | 60 | 60 | 80 | 80 | 40 | 40 | 20 | 20 |
| MDI (parts by weight) | 0.6 | — | 0.6 | — | 0.6 | — | 0.6 | — |
| Flexural strength (kg/cm$^2$) | 1190 | 730 | 1200 | 900 | 1210 | 810 | 1230 | 1150 |
| Izod impact strength without a notch (kg-cm/cm) | 31 | 12 | 28 | 11 | 42 | 15 | 63 | 29 |
| Heat distortion temperature (°C.) | 174 | 149 | 140 | 118 | 186 | 171 | 188 | 187 |
| Appearance | good | poor | good | poor | good | poor | good | poor |

Note:
The same footnotes as in Table 1 apply.

tion of the Soxhlet extraction residue of the resulting resin composition was 100%.

EXAMPLE 14

Three kilograms of polyphenylene sulfide pellets TOHPREN T-4P, melt viscosity 3,300 poises at 300° C.; a product of TOHPREN Co. Ltd.) was mixed with 180 g of p-aminothiophenol, and the mixture was melt-kneaded and pelletized at 320° C. by a twin-screw extruder and to give modified polyphenylene sulfide.

One kilogram of the resulting modified polyphenylene sulfide was mixed with 4 kg of the modified polyphenylene ether obtained in Referential Example 2, and the mixture was melt-extruded and pelletized at 300 to 320° C. by a twin-screw extruder. Four kilograms of the resulting pellets were mixed with 4 kg of unmodified polyphenylene sulfide (TOHPREN T-4P) and 80 g of 4,4'-diphenylmethane diisocyanate. The mixture was again kneaded and extruded. The resulting resin composition was subjected to Soxhlet extraction with chloroform as a solvent as in Example 1. The proportion of the extraction residue was 100%.

Test samples were prepared as in Examples 6 to 9, and their properties were measured. The results were as follows:

Flexural strength: 1,200 kg/cm$^2$
Izod impact strength (without a notch): 42 kg-cm/cm
Heat distortion temperature: 145° C.
Appearance: good

EXAMPLE 15

By operating in the same way as in Example 1, a resin composition was prepared by using 40 parts by weight of the unmodified polyphenylene ether used in Referential Example 1, 60 parts by weight of the polyphenylene sulfide pellets used in Example 1, 0.5 part by weight of maleic anhydride, and 1.1 parts by weight of 4,4'-diphenylmethane diisocyanate. The proportion of the Soxhlet extraction residue of the resulting resin composition was 95%. Test samples were prepared as in Examples 6 to 9, and their properties were measured. The results were as follows:

Flexural strength: 1,050 kg/cm$^2$
Izod impact strength (without a notch): 27 kg-cm/cm
Heat distortion temperature: 170° C.
Appearance: good

We claim:
1. A resin composition consisting essentially of
   (A) a polyphenylene ether having added thereto an unsaturated carboxylic acid having 3 to 10 carbon atoms or an anhydride thereof (component A),
   (B) a polyphenylene sulfide (component B), and
   (C) a polyisocyanate compound (component C), the weight ratio of component A to component B being from 5:95 to 95:5 and the amount of component C being from 0.01 to 10% by weight based on the total weight of components A and B.

2. The resin composition of claim 1 in which the weight ratio of component A to component B is from 20:80 to 80:20.

3. The resin composition of claim 1 or 2 in which the amount of component C is from 0.05 to 5% by weight based on the total weight of components A and B.

4. The resin composition of claim 1 or 2 in which component A is a polyphenylene ether having added thereto 0.01 to 5% by weight of an unsaturated carboxylic acid having 3 to 10 carbon atoms or its anhydride.

5. The resin composition of claim 1 or 2 in which the polyphenylene ether has a number average molecular weight of about 5,000 to about 50,000.

6. The resin composition of claim 1 or 2 in which the polyphenylene sulfide has a melt viscosity at 300° C. of about 100 to about 40,000 poises.

7. A reinforced resin composition composed of 100 parts by weight of the resin composition of claim 1, and 5 to 100 parts by weight of glass fibers.

8. A molded article obtained by melt-kneading the resin composition of claim 1 or 7 and then molding the kneaded mixture.

9. The molded article of claim 8 in which the melt-kneading is carried out at a temperature of about 150 to about 370° C.

* * * * *